US011996666B2

(12) United States Patent
Schrader et al.

(10) Patent No.: US 11,996,666 B2
(45) Date of Patent: *May 28, 2024

(54) DECAGON COMPRESSION DIE

(71) Applicant: Hubbell Incorporated, Shelton, CT (US)

(72) Inventors: Gary Schrader, Manchester, NH (US); David Boudreau, Manchester, NH (US); Peter Chan, Toronto (CA)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,884

(22) Filed: May 2, 2023

(65) Prior Publication Data

US 2023/0275383 A1 Aug. 31, 2023

Related U.S. Application Data

(63) Continuation of application No. 16/378,977, filed on Apr. 9, 2019, now Pat. No. 11,677,203.

(Continued)

(51) Int. Cl.

*H01R 43/042* (2006.01)
*H01R 4/18* (2006.01)

(52) U.S. Cl.

CPC ........... *H01R 43/0428* (2013.01); *H01R 4/18* (2013.01)

(58) Field of Classification Search

CPC ........ B25B 27/10; B21D 39/048; H01R 4/18; H01R 4/183; H01R 43/0428; H01R 43/058; H01R 43/04

See application file for complete search history.

(56) References Cited

U.S. PATENT DOCUMENTS 3,088,761 A * 5/1963 Myers .................. H01R 43/058 439/879
3,616,674 A * 11/1971 Piasecki et al. ..... H01R 43/058 72/470

(Continued)

FOREIGN PATENT DOCUMENTS

CN 1610185 A 4/2005
CN 1921238 A 2/2007

(Continued)

OTHER PUBLICATIONS

First Office Action dated Dec. 3, 2021, by China National Intellectual Property Administration in corresponding Chinese Patent Application No. 201980028244.1 and an English translation of the Action. (14 pages).

(Continued)

*Primary Examiner* — Teresa M Ekiert
(74) *Attorney, Agent, or Firm* — Robinson + Cole LLP

(57) ABSTRACT

A compression die configured to crimp a composite core is disclosed. The compression die includes an outer body having a tool engaging surface, and an inner body coupled to the outer body. The inner body has a crimping area, wherein the crimping area of the inner body includes ten planar surfaces. The ten planar surfaces are positioned at an angle with respect to an adjacent planar surface such that the combination of the ten planar surfaces form a decagon shaped channel. Crimping is performed by the compression die by inserting the composite core into an encasing connector, which is then inserted into the decagon shaped channel of the compression die. A radial force towards the center of the decagon shaped channel is applied until an outer circumference of the encasing connector containing the composite core fully engages a surface area of each of the ten planar surfaces.

20 Claims, 4 Drawing Sheets

Related U.S. Application Data

(60) Provisional application No. 62/654,624, filed on Apr. 9, 2018.

(56) References Cited

U.S. PATENT DOCUMENTS

| | | | |
|---|---|---|---|
| 4,027,519 | A | 6/1977 | Bachle |
| 2001/0002508 | A1 | 6/2001 | Yamakawa |
| 2003/0088962 | A1 | 5/2003 | Goop |
| 2004/0200060 | A1 | 10/2004 | Shutts et al. |
| 2011/0168428 | A1 | 7/2011 | Shibuya et al. |
| 2012/0067863 | A1 | 3/2012 | Suzuki et al. |
| 2013/0252459 | A1 | 9/2013 | Tanaka et al. |
| 2014/0262497 | A1 | 9/2014 | De France et al. |
| 2014/0342890 | A1 | 11/2014 | Gilbreath |
| 2016/0104994 | A1 | 4/2016 | Cramer et al. |
| 2016/0301174 | A1 | 10/2016 | De France et al. |
| 2017/0087620 | A1 | 3/2017 | Goff et al. |

FOREIGN PATENT DOCUMENTS

| | | | |
|---|---|---|---|
| CN | 101779014 | A | 7/2010 |
| CN | 102027648 | A | 4/2011 |
| CN | 107680738 | A | 2/2018 |
| FR | 2991496 | A1 | 12/2013 |
| JP | 2009-197714 | A | 9/2009 |

OTHER PUBLICATIONS

The extended European search report dated Dec. 2, 2021, by the European Patent Office in corresponding European Patent Application No. 19785066.2. (8 pages).

International Search Report and the Written Opinion dated Jun. 14, 2019, by the International Searching Authority in corresponding International Patent Application No. PCT/US2019/026499. (17 pages).

* cited by examiner

DECAGON COMPRESSION DIE

RELATED APPLICATION

The application is a Continuation of U.S. Non-Provisional application Ser. No. 16/378,977, filed Apr. 9, 2019, which claims priority to U.S. Provisional Patent Application 62/654,624, filed Apr. 9, 2018, the entire contents of which are hereby incorporated.

FIELD

Embodiments relate to a crimp die for connecting a core of a conductor to an electrical connector assembly. Furthermore, embodiments relate to a method of connecting a core of a conductor to an electrical connector assembly.

SUMMARY

High voltage transmission conductors may include strands of high strength steel surrounded by multiple strands of aluminum wire. The steel strands are the principle load bearing component holding up the wire, while the softer, more elastic aluminum strands include the majority of the electrical power transport component. Many variations of transmission wire operating at between approximately 115 kV to 800 kV involve this design concept and have these two components.

In order to mechanically secure a high voltage transmission conductor to an electrical connector assembly used in the transmission of power, crimping dies and/or other compression tools are used. Compression tools may include a diehead assembly that develops substantial crimping force. Compression tools may be operated using hydraulic, electric, pneumatic, or manual power.

To form an electro-mechanical connection between the high voltage transmission conductor and the electrical connector, single stage and two stage crimping operations may be performed. During a single stage crimping operation, a conductor wire is initially stripped of any insulation, at least at the ends, and inserted into an electrical connector. The electrical connector is assembled and then placed into the diehead assembly. The diehead assembly includes a pair of jaws that retain crimping dies designed to apply a crimping force to the electrical connector. Upon actuation of the compression tool, a moveable crimping die compresses and deforms the connector assembly, thus securing it to the conductor wire. After crimping is complete, the tool is disengaged by retracting the moveable die.

During a two stage crimping operation, aluminum strands surrounding a core of a conductor wire are first cut back to expose the conductive core that includes the principal load bearing portion of the conductor wire. The exposed core is inserted into a steel tube of an electrical connector, and the electrical connector is placed into the diehead assembly to be crimped, thus deforming the steel tube and mechanically securing it to the conductive core. Next, the aluminum strands, which include the majority of the electrical power transport component of the conductor wire, are also crimped by the diehead assembly or a similar crimping assembly to form an electrical connection with an encasing aluminum tube. This crimping process generally requires that the conductive core be able to tolerate a certain amount of radial compression force at its surface without suffering damage that could potentially decrease its transmission efficiency.

More recently, a composite core cable (for example, an Aluminum Conductor Composite Core (ACCC) cable) having a light-weight advanced composite core wrapped by aluminum conductor wires has emerged as a substitute for the steel support stranding in high voltage transmission conductors. The composite core's lighter weight, smaller size, and enhanced strength and other performance advantages over a traditional steel core allows a composite core cable to increase the current carrying capacity over existing transmission and distribution cables and virtually eliminate high-temperature sag.

However, the outer surface of the composite core is difficult to mechanically connect to a compression tube of an electrical connector assembly. The outer surface of the composite core is sensitive, such that a scratch (for example, transverse scratches and cracks) on the outer surface can lead to a fracture of the composite core. Due to the sensitivity of the composite core, composite core conductors are generally connected with a physical connection (for example, a collet and housing, a wedge connector, etc.) rather than crimped. Accordingly, a need exists for a crimp die that minimizes deformation/ovalization of an inserted electrical connector containing a composite core conductor so that damage to the outer surface of the composite core may be decreased or essentially eliminated.

One embodiment discloses a compression die configured to crimp a composite core. The compression die includes an outer body having a tool engaging surface, and an inner body coupled to the outer body. The inner body has a crimping area, wherein the crimping area of the inner body includes ten planar surfaces. Each of the ten planar surfaces are positioned at an angle with respect to an adjacent planar surface such that the combination of the ten planar surfaces form a decagon shaped channel.

Another embodiment discloses a method of crimping a composite core using a compression die. The method includes inserting the composite core into a decagon shaped channel of the compression die, and applying a radial force towards a center of the decagon shaped channel. The decagon shaped channel includes ten planar surfaces. The radial force is applied until an outer circumference of the composite core fully engages a surface area of each of the ten planar surfaces.

Other aspects of the application will become apparent by consideration of the detailed description and accompanying drawings.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
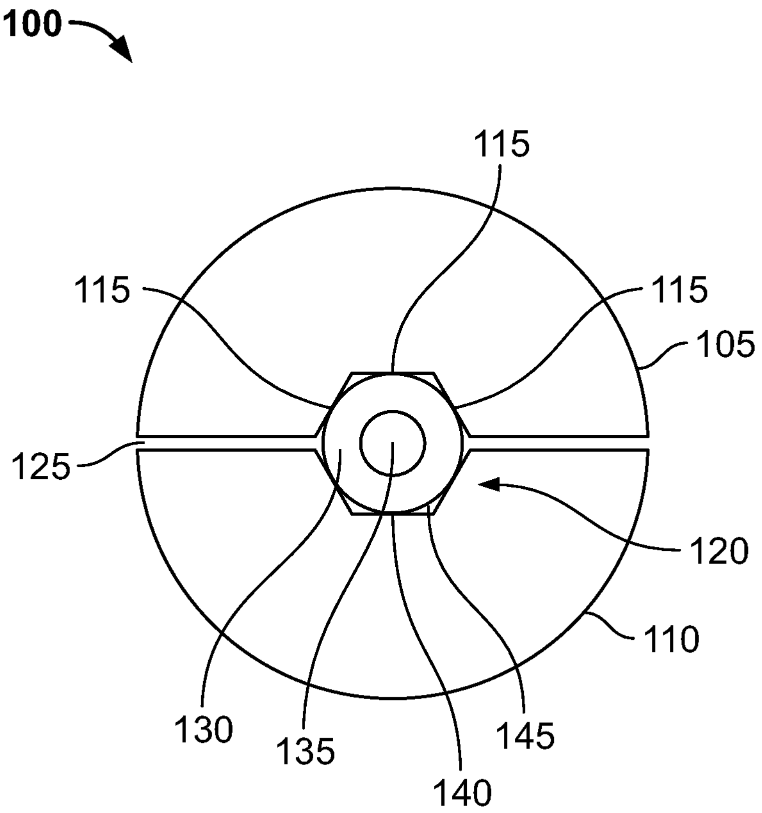
FIG. 1 (Prior Art)
FIG. 1 is a cross-sectional view of a conventional compression die for crimping a conducting core.

Before any embodiments of the application are explained in detail, it is to be understood that the application is not limited to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

As described herein, terms such as "front," "rear," "side," "top," "bottom," "above," "below," "upwardly," and "downwardly" are intended to facilitate the description of the electrical receptacle of the application, and are not intended to limit the structure of the application to any particular position or orientation.

Exemplary embodiments of devices consistent with the present application include one or more of the novel mechanical and/or electrical features described in detail below. Such features may include an outer body having a tool engaging surface and an inner body coupled to the outer body, the inner body having a crimping area. In exemplary embodiments of the present application, various features of the crimping area will be described. The novel mechanical and/or electrical features detailed herein efficiently minimize deformation/ovalization of an inserted composite core during a crimping process such that damage to the outer surface of the crimped composite core may be decreased or essentially eliminated. Although the application will be described with reference to the exemplary embodiments shown in the figures, it should be understood that the application can be embodied in many alternate forms of embodiments. In addition, any suitable size, shape, or type of elements or materials could be used. Furthermore, the exemplary embodiments detailed herein may be used for all compression applications (for example, aluminum, steel, or other metals not exhaustively detailed herein).

Figure 2:
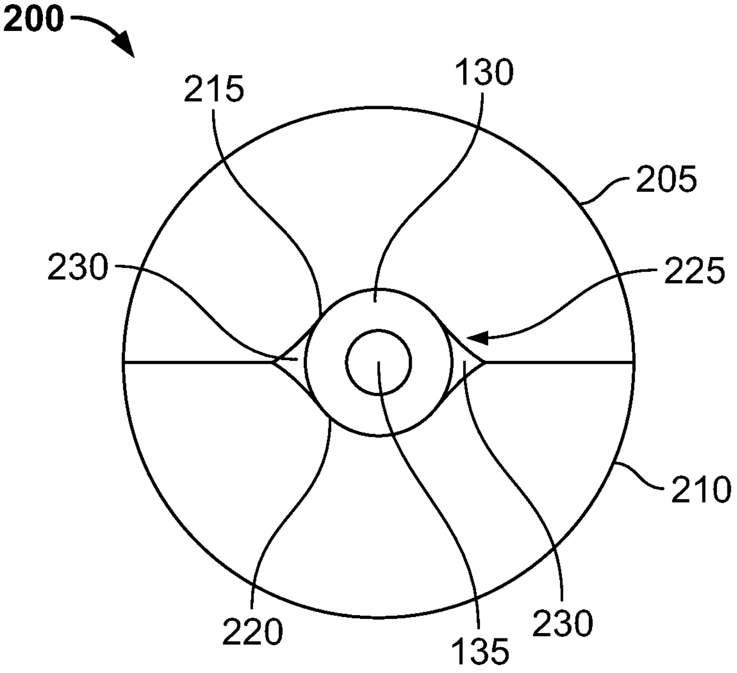
FIG. 2 (Prior Art)
FIG. 2 is a cross-sectional view of another conventional compression die for crimping a conducting core.
Figure 3:
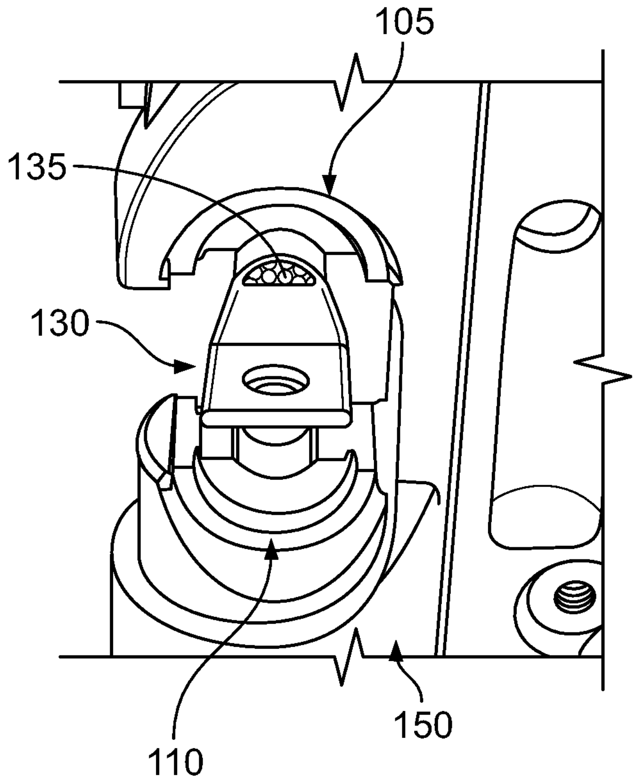
FIG. 3 is a perspective view of a crimping tool during the initial stage of a crimping process.
Figure 4:
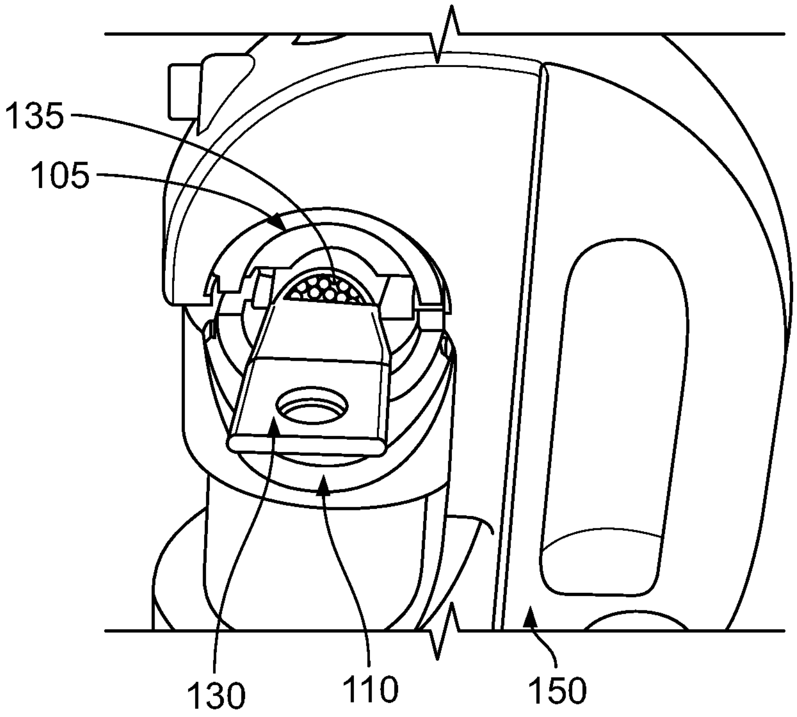
FIG. 4 is a perspective view of the crimping tool of FIG. 3 during a compression stage of the crimping process.

Two conventional compression die designs for crimping a conducting core are shown in FIGS. 1 and 2. Referring to FIG. 1, a conventional compression die 100 includes a top jaw 105 and a bottom jaw 110, each jaw 105/110 may include a plurality of planar surfaces 115 that combine to form a substantially hexagonal crimping area 120 of the compression die 100. During a crimping process shown in FIGS. 3-4, the top jaw 105 and the bottom jaw 110 couple to a crimping tool 150, which may be operated using hydraulic, electric, pneumatic, or manual power. A ram in the crimping tool 150 moves the top jaw 105 and bottom jaw 110 from an initially open position (see FIG. 3) toward each other to a closed position (see FIG. 4). This process causes the compression die 100 to close a gap 125 between the jaws 105/110 and form the crimping area 120 configured to receive an electrical connector 130 including a core 135. The planar surfaces 115 apply a radial compression force on the electrical connector 130 and inserted core 135 via contact points 140. The radial compression force deforms the electrical connector 130 and inserted core 135 such that material of the connector 130 travels from the contact points 140 to corners 145 until an entire surface area of the electrical connector 130 engages with an entire surface area of the crimping area 120. A limited number of contact points 140 may result in excessive force on a small surface area of the connector 130, which may then undesirably deforms the surface of the connector 130. This deformation causing excess material of the connector 130 to travel to the corners 145 may lead to detrimental damages to the delicate surface of a composite core in a composite core cable, thereby negatively affecting the composite core cable's transmission efficiency and properties.

Referring to FIG. 2, another conventional compression die 200 with a different crimping area configuration is designed to minimize the amount of material travel and deformation of the core in comparison to the compression die 100 of FIG. 1. The compression die 200 also includes a top jaw 205 and a bottom jaw 210 configured to couple to a crimping tool 150. Rather than having a plurality of planar surfaces 115 that form a hexagonal crimping area 120 as seen in the compression die 100 of FIG. 1, the top jaw 205 includes a first crimp surface 215 and the bottom jaw 210 includes a second crimp surface 220. Both the first crimped surface 215 and the second crimped surface 220 are configured as smooth curvatures such that when the top jaw 205 and the bottom jaw 210 moves toward each other during the crimping process of FIGS. 3-4, a crimping area 225 is formed substantially shaped as a circle with two pinched ends 230. The crimping area 225 applies a radial compression force to the inserted electrical connector 130, thus deforming the electrical connector 130 and core 135 and causing material travel to each of the pinched ends 230. Although the two pinched ends 230 of the compression die 200 allows considerably less material travel than the six corners 145 of the compression die 100, the deformation to the electrical connector 130 and core 135 in the compression die 200 may still cause detrimental damage to the delicate surface of a composite core in a composite core cable. Thus, another compression die configuration is necessary to further minimize material travel and ovalization/deformation of the core 135.

Figure 5:
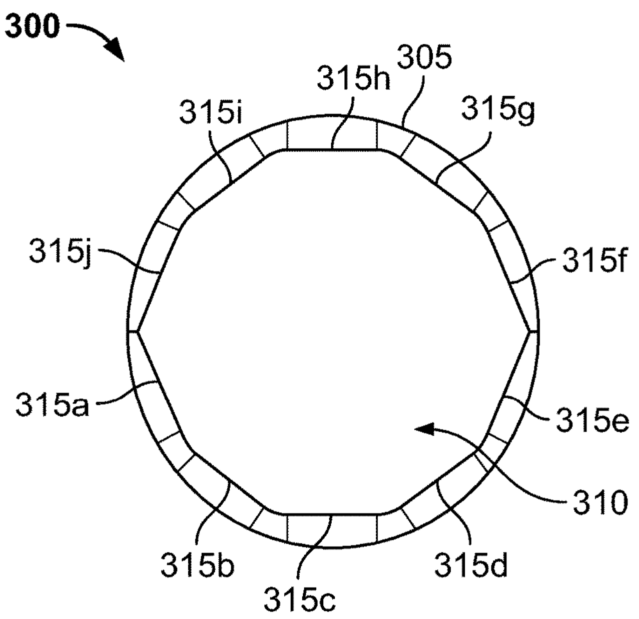
FIG. 5 is a cross-sectional view of a decagon crimp die inner body for crimping a composite core of an electrical connector assembly according to an exemplary embodiment.

Referring to FIG. 5, a cross-sectional view of a decagon crimp die inner body 300 for crimping a composite core is shown, according to some embodiments of the application.

Figure 6:
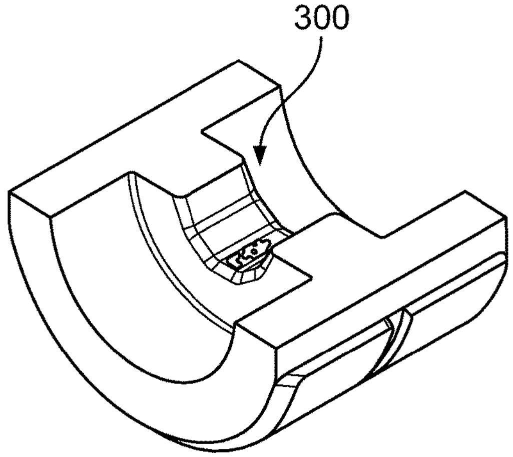
FIG. 6 is a side perspective view of one jaw of the decagon crimp die inner body shown in FIG. 5 according to some embodiments.

It should be understood that the inner body 300 shown in FIG. 5 may be coupled to an outer body as shown in FIG. 6 to form the jaw 105/110 of the compression die. The decagon crimp die 300 includes a tool engaging surface 305 configured to couple to the crimping tool 150 (see FIG. 3-4) and a crimping area 310 formed by a plurality of planar surfaces 315*a-j*. In the decagon crimp die 300, ten planar surfaces 315*a-j* form a decagon shaped crimping area 310. The crimping area 310 is configured to receive and crimp the core 135 such that enough deformation is cause to create a sufficient mechanical connection between the composite core 135 and the electrical connector 130. Furthermore, it would be understood by those skilled in the art that the decagon die inner body 300 may also be used to crimp a steel core to form an electro-mechanical connection for the steel core or aluminum strands surrounding the core. Referring to FIG. 6, in some embodiments, one of the ten planar surfaces 315*a-j* serves as a flat surface for an embossed index number used to differentiate and organize multiple crimps dies 300. The flat surface may also include a "T" dimension measurement, or a verification or quality control parameter, of the crimp die 300. For example, the "T" dimension in the present embodiment measures the distance between opposite planar surfaces 315*a-j* on the crimp die 300 that are perpendicular to the line of movement of the ram.

Figure 7:
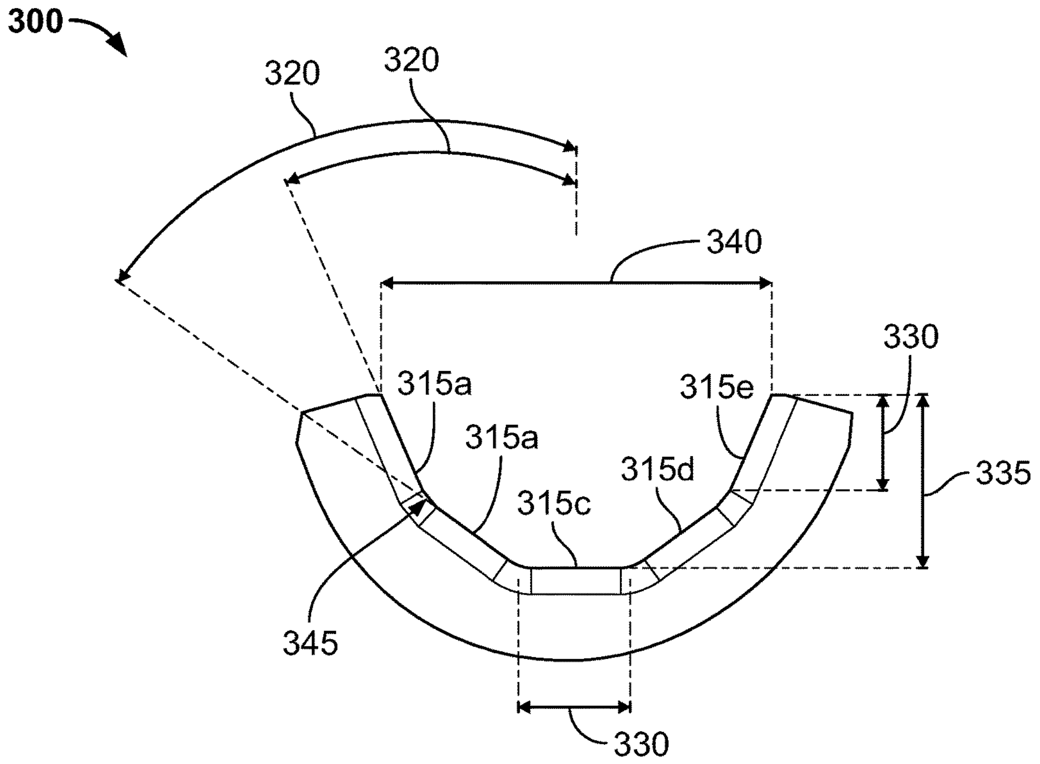
FIG. 7 is a cross-sectional view of one jaw of the decagon crimp die inner body according to some embodiments.

Referring to FIG. 7, each of the planar surfaces 315*a-j* may be positioned at an angle 320 between approximately 0° and approximately 180°, non-inclusive, with respect to a vertical reference line 325. The angle 320 formed by each planar surface 315*a-j* with respect to the vertical reference line 325 may vary such that the combination of the ten planar surfaces 315*a-j* form a decagon shaped crimping area 310. By varying the angle 320 formed by each planar surface 315*a-j* with respect to the vertical reference line 325, a differently shaped crimping area 310 may be produced to achieve similar crimping results. The variations and combinations of the angle 320 are not exhaustively detailed herein and do not deviate from the teachings of the present application.

Each planar surface 315*a-j* has a length of 330, which may vary for each planar surface 315*a-j* and not exhaustively detailed herein. The decagon crimp die 300 may have an inner radius of 335 and an inner diameter 340 such that a circumference of the decagon crimp die 300 is less than a circumference of the electrical connector 130 being crimped. This allows a radial compression force to be applied by the planar surfaces 315*a-j* of the decagon crimp die 300 to the electrical connector 130 and inserted core 135, thereby forming the necessary connections during the crimping process.

Figure 8:
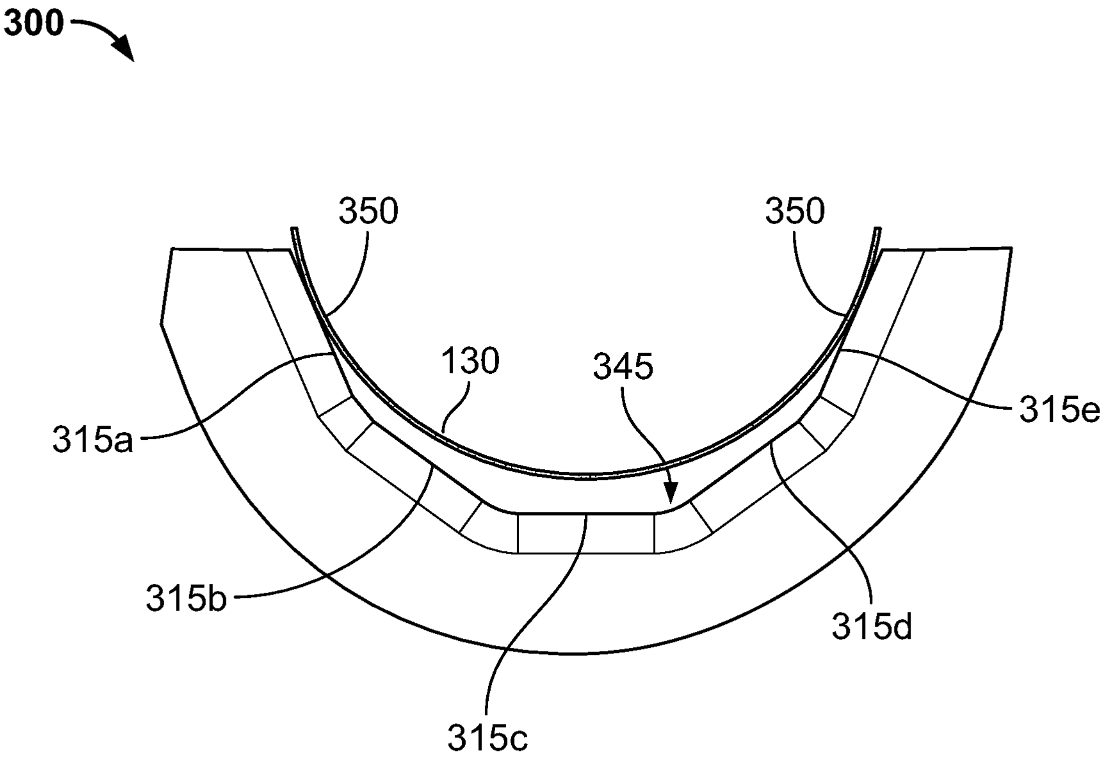
FIG. 8 is a cross-sectional view of one jaw of the decagon crimp die inner body with an electrical connector shown during an initial stage of a crimping process, prior to compression, according to some embodiments.

The decagon crimping area 310 includes a plurality of corners 345 formed at the intersections of each pair of adjacent planar surfaces 315*a-j*. During an initial stage of the crimping process shown in FIG. 8, the electrical connector 130 initially engages with contact points 350. As the crimping process progresses, the radial compression force is transferred via the contact points 350 from the planar surfaces 315*a-j* to the electrical connector 130 and inserted core 135. Material of the electrical connector 310 travels from the contact points 350 to the corners 345, causing slight deformation and ovalization of the electrical connector 130 and inserted core 135. Since the planar surfaces 315*a-j* form a decagon crimping area 310 with a more overall circular shape compared to that of the conventional compression dies 100 and 200 (see FIGS. 1-2), the deformation/ovalization of the electrical connector 130 and inserted core 135 is enough to form the necessary mechanical connection between the electrical connector 130 and inserted composite core 135 while avoiding excessive damage to the sensitive surface of the composite core 135. Additionally, the decagon crimping area 310 does not includes relatively large pinched (such as pinched ends 230), thus further preventing deformation to the electrical connector 130 and core 135. Furthermore, it would be understood by those skilled in the art that the decagon die inner body 300 may also be used to crimp a steel core to form an electro-mechanical connection for the steel core or aluminum strands surrounding the core.

Figure 9:
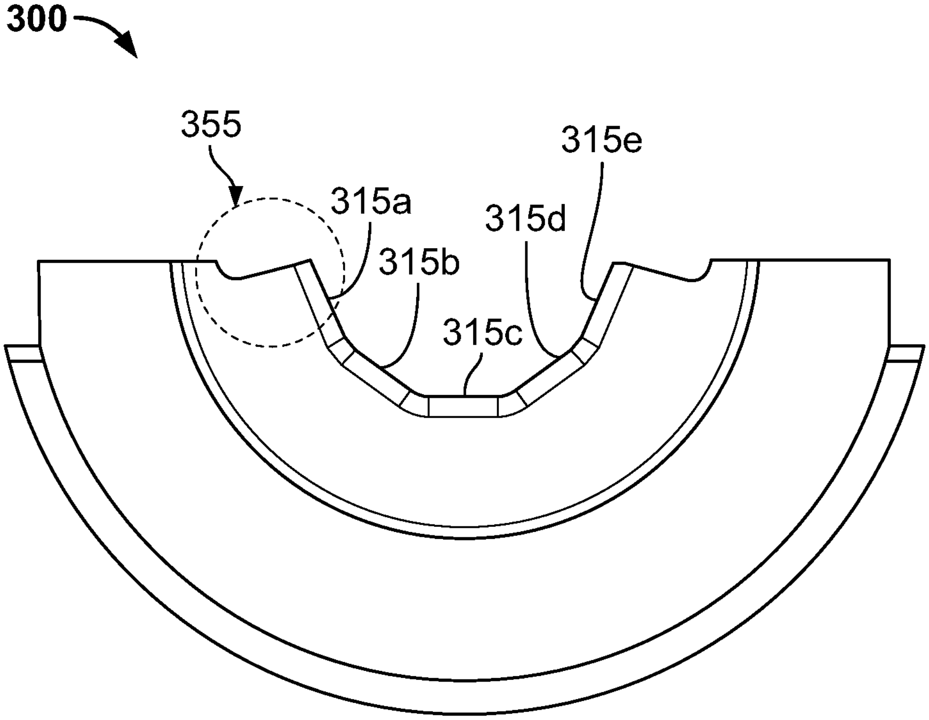
FIG. 9 is another cross-sectional view of one jaw of the decagon crimp die inner body according to some embodiments.

FIG. 9 shows another embodiment of the decagon crimp die inner body 300 including flash cutting pockets 355 disposed at opposing planar surfaces 315*a*/315*e* of the crimp die inner body 300 along the gap 125 (see FIGS. 1-2). When the top jaw 205 and the bottom jaw 210 move toward each other during the crimping process (see FIGS. 3-4), the force exerted by the planar surfaces 315*a-j* may cause excess material of the connector 130 to travel and extrude into the gap 125 before the ram fully closes the gap 125 between the jaws 205/210. This excess material of the connector 130 extruding into the gap 125 may prevent the top jaw 205 from contacting the bottom jaw 210 and fully closing the gap 125, thus causing an abnormal crimp-shape and forming an improper connection between the core 135 and the electrical connector 130. The flash cutting pockets 355 positioned along the gap 125 are shaped as indents in the decagon crimp die inner body 300 to form a pocket that may contain excess material of the connector 130. This allows the top jaw 205 and the bottom jaw 210 of the decagon crimp die 300 to meet and close the gap 125, even when excess material of the connector 130 travels and extrudes into the gap 125 during the crimping process. It would be understood by those skilled in the art that the flash cutting pockets 355 may be disposed on various combinations of the top jaw 205 and/or bottom jaw 210 of the decagon crimp die 300 in different embodiments.

Although disclosed as being a decagon-shaped compression die having ten sides, in other embodiments, the body 300 may have more than ten planar surface, each being positioned at an angle with respect to an adjacent planar surface. In yet other embodiments, the body 300 may have less than ten planar surface, each being positioned at an angle with respect to an adjacent planar surface.

All combinations of embodiments and variations of design are not exhaustively described in detail herein. Said combinations and variations are understood by those skilled in the art as not deviating from the teachings of the present application.

What is claimed is:

1. A compression die configured to crimp a composite core, the compression die comprising:

a top jaw;

a bottom jaw;

wherein the top jaw includes:

- a first engagement surface for engaging the bottom jaw;
- a first crimping area radially within the first engagement surface, the first crimping area including a first planar surface;
- a first flash cutting pocket formed between the first engagement surface and the first crimping area;
- a first vertex formed between the first flash cutting pocket and the first planar surface;

wherein the bottom jaw includes:

- a second engagement surface for engaging the top jaw;
- a second crimping area radially within the second engagement surface, the second crimping area including a second planar surface;

a second flash cutting pocket formed between the second engagement surface and the second crimping area;

a second vertex formed between the second flash cutting pocket and the second planar surface;

wherein the top jaw and the bottom jaw are configured such that, when the first engagement surface of the top jaw engages the second engagement surface of the bottom jaw, the first vertex of the top jaw engage the second vertex of the bottom jaw.

2. The compression die of claim 1, wherein the bottom jaw is a mirror of the top jaw.

3. The compression die of claim 1, wherein the top jaw includes five first planar surfaces equally spaced around the first crimping area.

4. The compression die of claim 3, wherein the bottom jaw includes five second planar surfaces equally spaced around the second crimping area.

5. The compression die of claim 4, wherein the top jaw and the bottom jaw are configured such that, when the top jaw is closed into engagement with the bottom jaw, the top jaw and the bottom jaw form a die crimping area including the five first planar surfaces of the top jaw and the five second planar surfaces of the bottom jaw, each of the resulting ten planar surfaces being positioned at an angle with respect to an adjacent planar surface such that the combination of the ten planar surfaces forms a decagon shaped channel.

6. The compression die of claim 5, wherein the decagon shaped channel is symmetrical about a central plane.

7. The compression die of claim 1, wherein the first flash cutting pocket is formed as an indent with a third planar surface inclined relative to the first planar surface.

8. A compression die configured to crimp a composite core, the compression die comprising:

a top jaw comprising:

a first crimping area formed by five first surfaces spaced apart about the first crimping area, and a pair of first flash cutting pockets formed radially outside of the first crimping area, each of the pair of first flash cutting pockets forming a first vertex between one of the first flash cutting pockets and one of the first surfaces of the first crimping area; and a bottom jaw comprising:

a second crimping area formed by five second surfaces spaced apart about the second crimping area, and a pair of second flash cutting pockets formed radially outside of the second crimping area, each of the pair of second flash cutting pockets forming a second vertex between one of the second flash cutting pockets and one of the second surfaces of the second crimping area;

wherein the top jaw and the bottom jaw are configured such that, when the top jaw engages the bottom jaw, the first vertices of the top jaw engage the second vertices of the bottom jaw.

9. The compression die of claim 8, wherein the top jaw is a mirror of the bottom jaw.

10. The compression die of claim 8, wherein the top jaw and the bottom jaw are configured such that, when the top jaw is closed into engagement with the bottom jaw, the top jaw and the bottom jaw form a die crimping area including the five first surfaces of the top jaw and the five second surfaces of the bottom jaw, each of the resulting ten surfaces being positioned at an angle with respect to an adjacent surface such that the combination of the ten surfaces forms a decagon shaped channel.

11. The compression die of claim 10, wherein the decagon shaped channel is symmetrical about a central plane.

12. The compression die of claim 8, wherein the five first surfaces and the five second surfaces are planar.

13. The compression die of claim 8, wherein the each of the pair of first flash cutting pockets is formed as an indent with a third surface inclined relative to one of the first surfaces.

14. The compression die of claim 8, wherein the pair of first flash cutting pockets are located along a gap of the compression die.

15. The compression die of claim 8, wherein the pair of first flash cutting pockets and the pair of second flash cutting pockets are configured to prevent improper connection between the composite core and an electrical connector.

16. A method of crimping a composite core using a compression die, the compression die including:

a top jaw comprising:

a first crimping area formed by five first surfaces spaced apart about the first crimping area, and a pair of first flash cutting pockets formed radially outside of the first crimping area, each of the pair of first flash cutting pockets forming a first vertex between one of the first flash cutting pockets and one of the first surfaces of the first crimping area; and a bottom jaw comprising:

a second crimping area formed by five second surfaces spaced apart about the second crimping area, and a pair of second flash cutting pockets formed radially outside of the second crimping area, each of the pair of second flash cutting pockets forming a second vertex between one of the second flash cutting pockets and one of the second surfaces of the second crimping area;

wherein the top jaw and the bottom jaw are configured such that, when the top jaw engages the bottom jaw, the first vertices of the top jaw engage the second vertices of the bottom jaw and the resulting ten planar surfaces form a decagon shaped channel;

the method comprising:

inserting the composite core into a connector;

inserting the connector encasing the composite core into the decagon shaped channel; and applying a radial force toward a center of the decagon shaped channel until an outer circumference of the connector encasing the composite core fully engages a surface area of each of the ten planar surfaces.

17. The method of claim 16, wherein a circumference of the decagon shaped channel encloses an outer circumference of the composite core.

18. The method of claim 16, wherein the first flash cutting pockets and the second flash cutting pockets are located along a gap of the compression die.

19. The method of claim 16, wherein the decagon shaped channel is symmetrical about a central plane.

20. The method of claim 16, wherein the flash cutting pockets are configured to prevent improper connection between the composite core and an electrical connector.

* * * * *